United States Patent

McNeal

[15] 3,668,299

[45] June 6, 1972

[54] ELECTRICAL CIRCUIT MODULE AND METHOD OF ASSEMBLY

[72] Inventor: Jack D. McNeal, Long Beach, Calif.

[73] Assignee: Beckman Instruments, Inc.

[22] Filed: Apr. 29, 1971

[21] Appl. No.: 138,587

[52] U.S. Cl. .......................174/52 PE, 29/627, 174/DIG. 3, 317/234 E, 264/272

[51] Int. Cl. .......................H05k 5/00

[58] Field of Search .......................174/52 S, 52 PE, DIG. 3; 317/101 R, 101 C, 234 E, 234 G; 29/588–590, 626, 627; 264/272

[56] References Cited

UNITED STATES PATENTS 3,325,586 6/1967 Suddick .......................174/52 PE

*Primary Examiner*—Darrell L. Clay
*Attorney*—Ferd L. Mehlhoff and Robert J. Steinmeyer

[57] ABSTRACT

An encapsulated electronic module including a nonconductive substrate having attached thereto a plurality of electrical components and an electrical network of connectors attached to the substrate and forming termination pads adjacent the edges of the substrate to which leads are attached. A flat cover is disposed over the substrate but spaced therefrom; the cover having a hole formed therethrough through which an encapsulation material is inserted between the substrate and cover completely filling the space therebetween. The encapsulation material extends at least partially into the opening in the cover member thereby securely attaching the cover member to the base member and sealing the space between these members.

14 Claims, 12 Drawing Figures

INVENTOR.
JACK D. McNEAL
BY Fred L Mehlhoff
ATTORNEY

INVENTOR.
JACK D. McNEAL
BY
Gerd L. Mehlhoff
ATTORNY

ELECTRICAL CIRCUIT MODULE AND METHOD OF ASSEMBLY

BACKGROUND OF THE INVENTION

1. Field of the Invention

The invention relates to electrical circuit modules of the flat-pack type employing a nonconductive base and an overlying cover and more particularly to the encapsulation and process for encapsulating the electrical components mounted between the base and the cover.

2. Description of the Prior Art

In general, electrical circuit modular devices comprise a plurality of active or passive electrical components supported on a flat surface of a thin nonconductive base member formed of a ceramic or plastic material. These components may be capacitors, resistors, or transistor devices or the like and may be in the form of components deposited on the substrate or may be discrete components attached to the substrate. The components are electrically connected by means of a deposited electrical network formed of electrically conductive material which is bonded or otherwise attached to the substrate.

Electronic modules such as those used in data processing systems, electronic instrumentation, or electronic assemblies for aircraft or missiles are housed in a packaging assembly that is adapted to minimize failure of the circuit due to damage. The technology for producing integrated microcircuit modules has become quite complex and, as these circuits are miniaturized, production costs, such as the cost related to the packaging of the circuitry, become extremely important.

"Flat-pack" type integrated circuit packages, which are sealed against environmental ingress by an epoxy or other encapsulating material, are extremely compact and versatile devices, but encapsulation has introduced some costly manufacturing problems. In these packages, a base member or substrate carries the integrated circuit and active and passive components thereon. A plurality of terminals, attached at one end to the circuitry, extend outwardly parallel to the base member. The electrical components are protected by a cover disposed over the circuitry and spaced to provide a short gap between the cover and the substrate. In this sandwich-like configuration, the gap is sealed with an encapsulation or potting material which is inserted between the cover and the substrate. The problem is to obtain a uniform disposition of the potting material into the gap or space between the members without trapping large amounts of air or otherwise failing to fully encapsulate the electronic components and ends of the terminals in the gap. In the prior art practice, the cover and substrate are held together and the potting material is applied around the edges of the gap. The unit is heated and the potting material is then drawn into the gap by capillary action. Then additional potting material is applied to the edges of the gap and the unit is again heated so that the material is again drawn into the gap. This action is repeated until the potting material fills the entire space between the substrate and cover. Such a procedure is awkward and time consuming and produces many defective devices because of the poor seal or because air has become trapped in the gap during the numerous encapsulation steps.

SUMMARY OF THE INVENTION

It is the general object of the invention to provide an improved integrated circuit module or assembly of the flat-pack type in which an encapsulation material is sandwiched between two protective substrate members to fully seal the space and electrical components therebetween.

A more specific object of the invention is to provide a flat-pack structure which facilitates encapsulation by automated, high volume production techniques.

It is another object of the invention to provide a flat-pack integrated circuit structure in which the amount of encapsulating material is automatically metered into the gap between the cover and substrate.

It is still another object of the invention to provide a new and improved process for producing an encapsulated electrical circuit assembly.

Briefly, the present invention is directed to an encapsulated electrical assembly comprising a flat substrate member and a flat cover member arranged substantially parallel to each other to provide a space therebetween in which are mounted a plurality of electrical components electrically interconnected by conductive connectors disposed on at least one of the substrates. The conductive connectors also form termination pads adjacent the edges of the substrate to which a plurality of external leads are attached. The cover is provided with at least one hole therein having a volume substantially equivalent to that volume formed by the space between the cover and substrate. An encapsulation material, inserted through the hole in the cover, fills the space between the substrate and the cover around the electrical components and the ends of the leads and extends partially into the opening in the cover member thereby securely attaching the cover member to the base member and sealing the space between these members.

BRIEF DESCRIPTION OF THE DRAWINGS

For a better understanding of the invention, reference may be had to the accompanying drawings in which.

DESCRIPTION OF THE PREFERRED EMBODIMENTS

Figure 1:
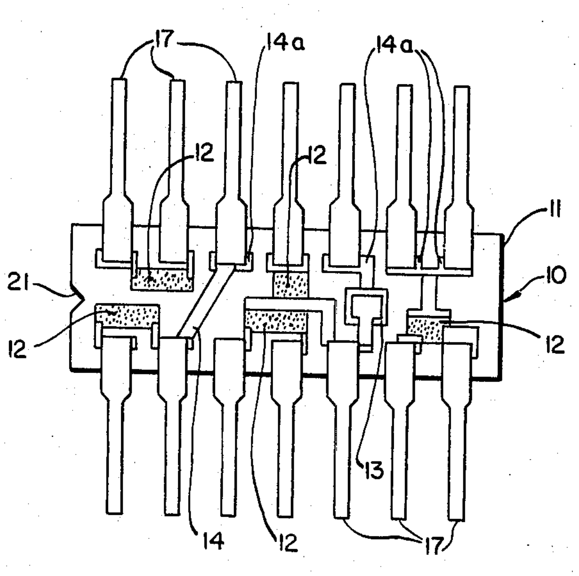
FIG. 1 is a plan view of a nonconductive base member supporting an electrical circuit including resistors and capacitors deposited on the base member and illustrating the attachment of terminal lead members to the edge of the base member and extending outwardly therefrom.
Figure 2:
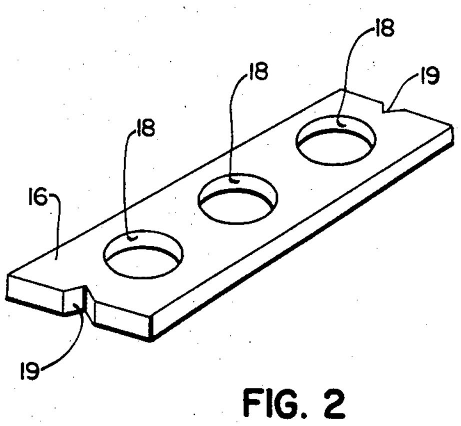
FIG. 2 is a perspective view of a nonconductive cover member in the form of a thin wafer having a plurality of holes formed therein.

Referring now to FIGS. 1 and 2, there are shown the major components of a modular integrated circuit assembly. FIG. 1 illustrates a representative type integrated circuit or microcircuit device including a suitable base member or substrate 10 which is usually in the form of a flat rectangular wafer. FIG. 2 illustrates the cover adapted to be placed above the integrated circuit assembly of FIG. 1. Preferably, the cover and base members are formed of a nonconductive, high temperature resistant material such as ceramic material of alumina, steatite or the like. Other types of materials may be employed such as a glass filled epoxy or any other plastic or insulating material.

Deposited on the flat surface 11 of the base or substrate 10 is an electrical network, including a plurality of resistance elements 12, a capacitor 13 and a network of conductive material forming electrical connectors 14 arranged to conduct an electrical current between the various components of the device. As may be seen in FIG. 2, the electrical connectors also extend toward the outer edges of the device and form termination pads 14a at predetermined points along the substrate.

In the version of the invention disclosed in FIG. 2, the components are all attached directly to the surface 11 of the substrate. Other such components, such as discrete resistors, discrete capacitors and transistors or diodes may be attached in similar fashion or in any other well known manner, such as by leads or mounting studs supported through mounting holes formed in the substrate. In any such device, it is desirable to have the electrical network deposited on the surface 11 of the substrate. The electrical connections between the network connectors 14 and the discrete components can be made in any well known manner, such as by lead wires soldered to the network and to the terminals of such devices.

The deposited network of interconnecting electrical connectors 14 is best formed of a material which makes a bond with the base or substrate member. When the base member is a ceramic, such as steatite or alumina, it is preferable to employ a "fired-on" conducting material which reacts with the surface of the substrate at high temperatures. Such a "fired-on" conductive material to be used with a ceramic base should preferably contain a small percentage of glass or metal oxide which thoroughly wets the surface of the ceramic substrate at temperatures high enough to melt the glass. While the relative quantities of conductive material and glass in these materials may vary substantially, depending upon the materials employed, tested embodiments have used from 10 to 60 percent glass or metal oxides and from 40 to 90 percent powdered metal conductive particles such as gold, palladium, silver or other noble metal particles. The glass constituent of the "-fired-on" material reacts with the steatite or alumina substrate and a portion of the substrate actually melts or fuses into the glass "fired-on" material to form an extremely durable bond. The conductive metal particles are in turn securely retained in the glass binder to form a conductive path to the respective components.

The microcircuit module of FIG. 1 discloses only one example of an integrated circuit device. It will be understood that there is no intention to limit the invention to the particular circuitry disclosed. On the contrary, it is contemplated that active and passive components forming any particular circuitry may be employed as long as they may be attached to a suitable substrate and positioned between such a substrate and the cover member 16 illustrated in FIG. 2.

As may be seen in FIG. 1, a plurality of terminals or leads 17 are attached to the termination pads on the surface of the substrate and extend outwardly in a direction generally parallel to the surface of the substrate. Terminals 17 are soldered or otherwise attached to the termination pads 14a formed on the substrate and make a good electrical connection to the network. The terminals 17 may be formed of copper, brass, or other conductive malleable material such as the material sold under the trade mark Kovar by Westinghouse Electric Corporation.

The cover 16 is normally formed of similar material as that of the base member and is provided with at least one throughhole or opening 18 which may be either molded during the formation of the cover or machined into the cover after the cover is formed. In the illustrated embodiment, the cover 16 is provided with notches 19 at the ends of the cover which are employed to align the cover with respect to a similar notch 21 formed in the substrate or base member.

Figure 3:
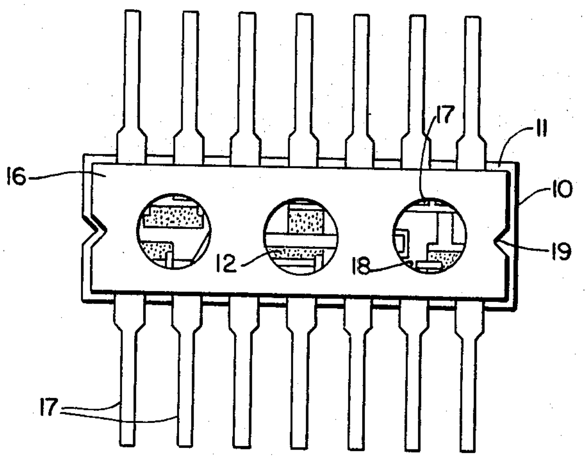
FIG. 3 illustrates the assembly of the cover of FIG. 1 above the base member of FIG. 2.
Figure 4:
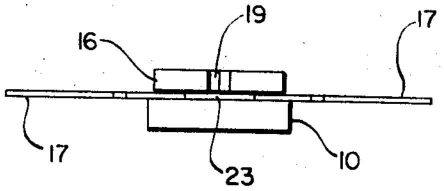
FIG. 4 is an end elevation view showing the cover mounted above the base member and supported on terminal leads extending from the base.

As shown in FIGS. 3 and 4, the cover 16 is positioned over the base 10 and substantially parallel to the surface of the substrate and symmetrically arranged thereover. In FIG. 3, the cover rests on the surface of the terminal leads 17 thereby forming a gap 23 between the lower flat surface of the cover and the upper flat surface of the substrate 10. In this embodiment of the invention, the gap 23 is essentially of a thickness equal to the terminal's thickness where attached to the substrate. It will be understood, however, that the cover 16 does not necessarily have to rest on the terminal members but may be spaced by other means above the substrate to form a gap 23 between these members.

There is a definite relationship between the volume of the openings 18 formed in the cover 16 and the volume of space between the respective surfaces of the cover member and the substrate. It is necessary for flow and uniform encapsulation of the assembly, as will be later explained, that the volume of the openings 18 be equivalent to or somewhat greater than the volume of the space 23 between the base member 10 and the cover 16. This space is, of course, defined by the rectangular dimensions of the smaller of the substrate or the cover and the thickness or width of the space between these two members.

Figure 5:
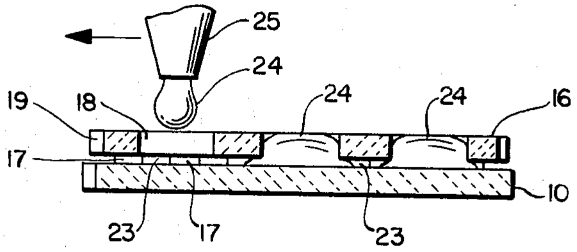
FIG. 5 illustrates the insertion of encapsulation material into the holes in the cover member for filling the space between the cover and the base.

As will be seen in FIG. 5, when the cover 16 is suitably positioned over the surface of the base member 10, a potting or encapsulation material 24 is inserted into the openings 18 where it flows downwardly into the space 23 between the two members. This electrically nonconductive encapsulation material is preferably in a liquid or paste form that may be solidified by heating or by use of a suitable catalyst to effect curing of the material. For example, a high molecular weight 100 percent solids epoxy, which is initially a viscous fluid, may be used. The potting material may also be in powder or granular form and deposited within the holes 18 and heated to melt the material.

Figure 6:
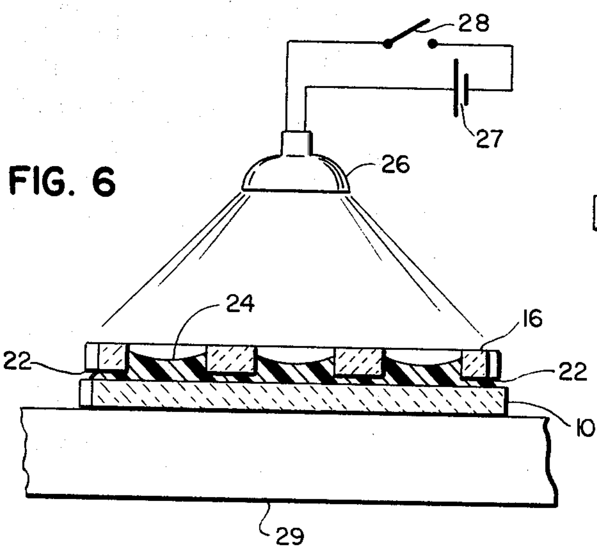
FIG. 6 illustrates the heating step in which the encapsulation material is drawn by capillary action into the space between the base and cover to completely surround the electrical components therebetween.
Figure 8:
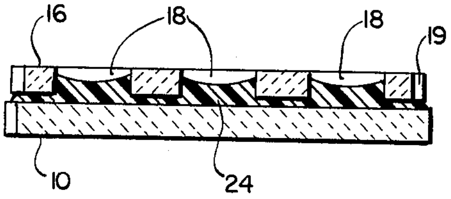
FIG. 8 is a cross-sectional view taken along line 8—8 of FIG. 7.
Figure 7:
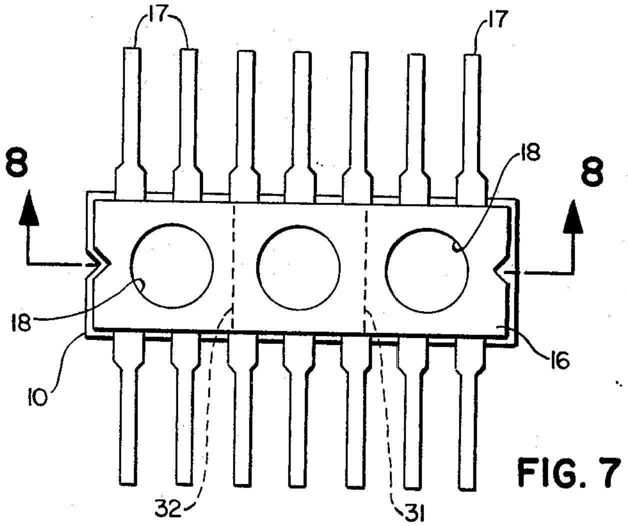
FIG. 7 is a plan view of the encapsulated circuit module.

Each opening 18 acts as a reservoir and self-metering device for assuring a correct fill of encapsulation material for the space between the two members. Then, depending upon the type of potting material employed, the assembly is subjected to a curing step. Normally the epoxy-type encapsulation material is subjected to a heating step, such as by an infrared lamp, for a period of three minutes at approximately 150° C. Other types of potting materials such as polyurethane plastic material or silicone potting compounds are commonly used in the field. In the embodiment shown in FIG. 6, the assembly is subjected to heat such as, for example, the infrared lamp 26 above the table or belt 25, which lamp is energized from a source of energy 27 by closing a switch 28 associated therewith. When heated, the encapsulation or potting material 24 quickly flows by capillary action to fill the gap 23. The capillary flow draws sufficient material 24 from the openings 18 to completely fill the gap 23, but does not allow substantially any material to flow beyond the outer edges 22 of the gap or space. Thus, when the gap 23 is full, no further encapsulation material 23 is withdrawn from the openings 18 and the openings 18 appear essentially as shown in FIGS. 7 and 8 upon completion of the potting process. Because the volume of the openings 18 is slightly greater than the volume of the space or gap 23, a small amount of encapsulation material 24 remains in the openings 18. This produces a very good seal, strongly attaching the cover 16 to the base member 10. The material 24, extending into the openings 18, provides a measure of strength against lateral movement of the cover with respect to the base, making an extremely strong and unitary structure.

Figure 9:
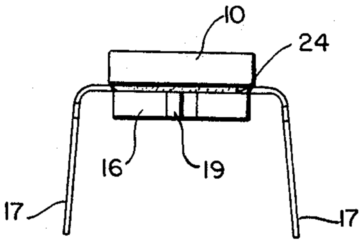
FIG. 9 is an end view of the encapsulated circuit module with the terminal leads bent in a direction adjacent the cover in position for intended use.

Once the unit is completed and the encapsulation material has cured, the terminal leads 17 may be formed into another structural arrangement. As shown in FIG. 9, the terminal leads are bent substantially at 90° to the base member 10. The normal position of the resulting structure is with the cover member 16 beneath the base member 10 so that the leads 17 may be positioned into a circuit board or the like.

As stated previously, it is desirable that the openings 18 be of a size such that the volume of the opening or openings through the cover 16 are at least equivalent to the volume of the space or gap 23. In practice, it is preferable that this volume be slightly greater than the space 23. However, the depth of the openings 18 (i.e. thickness of cover) cannot be too great or a build-up of hydrostatic pressure results when the encapsulation material is inserted and this tends to overcome the capillary tension and causes the encapsulation material to overflow the edges of the cover and base. However, the volume of the openings 18 cannot be significantly less than the volume of the space 23 because there will not be sufficient compound to fill the gap to the boundaries of the space.

Figure 10:
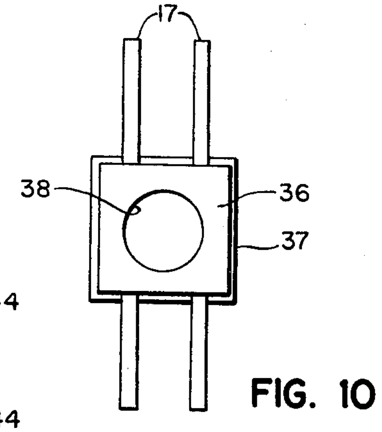
FIG. 10 is another embodiment illustrating a square device with a single hole in the cover for metering encapsulation material into the space between the cover and base.

As shown in FIG. 7, the disclosed device is an elongated unit having a length approximately three times its width. In this instance it is convenient to supply three openings 18 symmetrically arranged with respect to the space between the two members. In this particular embodiment each opening 18 is responsible for approximately one square having sides equivalent to the width of the cover, as illustrated by the phantom lines 31 and 32 dividing the cover into three sections. Obviously, other structural shapes may be employed. For example, if the electronic device is square in shape, such as illustrated in FIG. 10, it may be desirable to use only one hole or opening 38 through the cover 36. In this embodiment, the hole 38 provides a volume equivalent to the space beneath the cover 36 so that the encapsulation material when inserted therein fills the entire space between the cover 36 and base 37.

Figure 11:
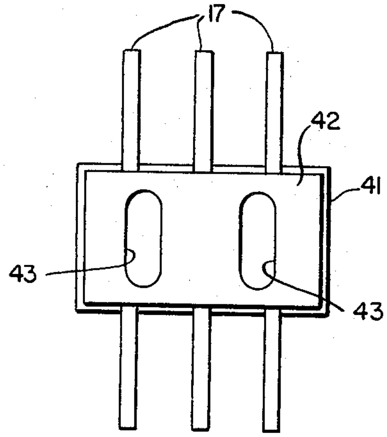
FIG. 11 illustrates still another embodiment with oblong holes formed in the cover and designed to facilitate encapsulation.

For other shapes, in order to produce a uniform encapsulation of the space, it may be desirable to make the openings other than round. As will be seen in FIG. 11, in the rectangular device comprising the base 41, cover 42 and lead 17, the openings 43 are oblong in shape and each opening covers a uniform portion of the structure. The potting compound, when inserted into the openings 43, flows in all directions and will be drawn by capillary action to cover all of the space beneath the cover 42.

Figure 12:
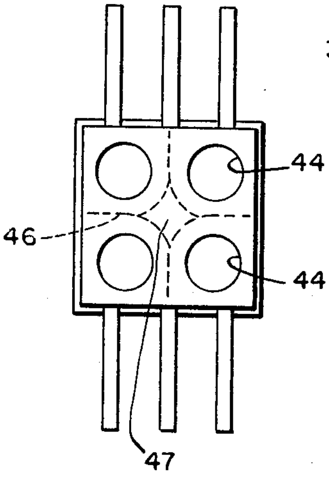
FIG. 12 illustrates a problem associated with encapsulation if the holes through the cover are not properly arranged.

It is more desirable to provide oblong or odd-shaped openings than it is to provide more than one row of openings. As will be seen in the device shown in FIG. 12, where two rows of openings 44 are provided, there is a likelihood that the potting compound will flow beneath the openings in a manner shown by the dotted lines 46. In such an instance, air may become trapped in a space such as space 47 closed by the potting compound as it meets the potting compound flowing from the adjacent openings. This not only reduces the effectiveness of the potting process but the trapped air may cause a deterioration of the electronic components subjected thereto under varying temperature conditions in which the device may be operated.

It will be understood that the most desirable feature of the invention is to insert the potting compound into the space 23 at some central point so that it flows outwardly in all directions toward the boundaries of the space. This may best be accomplished by inserting the encapsulation material through a hole or opening formed in the cover. It is conceivable that the potting compound could be inserted by means of a narrow probe into a central area of the space and the probe then quickly removed. However, most potting compounds do not lend themselves to this type of processing. In addition, when using a probe or other device for inserting the potting compound into the center of the space, it is necessary to provide a metering means so that just the right amount of material is introduced to fill the space. In the embodiment shown in the drawings, the openings 18 also serve as a rough metering means. By filling each opening, this assures complete filling of the space so long as the openings themselves have a volume substantially equivalent to that of the space.

In the disclosed embodiments the cover is shown to be slightly smaller than the base member. It will be understood that the cover member could be the same size as the base member or even larger than the base member. Also, it is possible to mount the electrical components and terminals on the cover member as well as the base member. The choice of terminology between "cover member" and "base member" as used in the specification merely facilitates the description and is not meant to be limiting in any way.

While in accordance with the Patent Statutes there have been described what are considered to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. An assembly of mounted electrical parts comprising:
a nonconductive base member;
electrical components mounted on said base member;
electrically conductive connectors deposited on said base member and forming electrical paths interconnecting said electrical components;
a plurality of terminal leads extending from said base member and having ends attached in electrical contact with said connectors on said base member;
a nonconductive cover member positioned over said base member and spaced therefrom forming a gap between said members, said cover having at least one opening formed therethrough;
an encapsulation material filling said gap between said cover member and said base member and sealing around said electrical components and said ends of said terminal leads.

2. The assembly defined in claim 1 in which said encapsulation material extends at least partially into said opening in said cover member.

3. An assembly of mounted electrical parts comprising:
a nonconductive base member;
electrical components mounted on said base member;
electrically conductive connectors on said base member forming electrical paths interconnecting said electrical components and forming termination pads adjacent the edges of said base member;
a plurality of terminal leads extending from said base member and having ends attached in electrical contact with said termination pads;
a nonconductive cover member positioned over said base member, said cover member supported above said base member on said ends of said terminal leads providing a gap between said members, said cover member having at least one opening formed therethrough;
an encapsulation material filling said gap between said members sealing the space around said electrical components and said ends of said leads and extending at least partially into said opening in said cover member thereby securely attaching said cover member to said base member.

4. The assembly defined in claim 3 in which said opening formed in said cover member is of a volume substantially equal to the volume of said space between said cover member and said base member.

5. The assembly of mounted electrical parts defined in claim 3 in which said encapsulation material is an epoxy resin.

6. An assembly of mounted electrical components comprising:
a nonconductive base member;
a nonconductive cover member;
electrical components mounted on at least one of said members and electrical connectors deposited on at least one of said members and forming electrical paths interconnecting said electrical components;
said base member and said cover member being arranged closely adjacent each other with a gap therebetween in which said electrical components are disposed;
at least one terminal lead having one end positioned in said gap and attached in electrical contact with an electrical connector;
one of said members having at least one opening formed therethrough perpendicular to said gap and symmetrically arranged with respect to said gap between said members;

an encapsulation material filling said gap between said members and sealing around said electrical components and said end of said terminal lead.

7. An assembly of mounted electrical parts comprising:

a thin nonconductive base member having a flat surface thereon;

electrical components mounted on said flat surface of said base member;

electrically conductive connectors deposited on said flat surface of said base member and forming electrical paths interconnecting said electrical components and forming termination pads adjacent the edges of said base member;

a plurality of terminal leads extending from said base member and having ends attached in electrical contact with said termination pads;

a nonconductive cover member having a flat surface positioned over said base member, said flat surface of said cover member arranged substantially parallel to said flat surface of said base member and supported a short distance therefrom providing a gap between said members;

a plurality of holes through said cover member, said composite volume of said holes in said cover being at least equal to the volume of said gap between said cover member and said base member;

an encapsulation material filling said gap between said cover member and said base member and sealing the space around said electrical components and said ends of said terminal leads, said encapsulation material extending at least partially into said openings in said cover member thereby securely attaching said cover member to said base member.

8. The assembly defined in claim 7 in which said substrate and said base member are elongated members and said holes through said cover are symmetrically spaced along the length thereof providing uniformly spaced volumes the total of which are substantially equal to the volume of said gap between said cover member and said base member.

9. A method of making an encapsulated electrical circuit module comprising the steps of:

providing a nonconductive base member and a nonconductive cover member;

forming an opening through one of said members;

forming an electrically conductive pattern on at least one of said members;

attaching electrical components to at least one of said members in contact with said electrical connectors thereon;

attaching the ends of terminal leads to said electrically conductive pattern on said one member, said terminal leads extending outwardly from said member;

arranging said cover member and said base member adjacent one another but spaced to form a gap therebetween with said electrical components in said gap;

inserting through said opening in said one member an encapsulating material and causing said material to flow by capillary action around said electrical components thereby to seal said space in said gap between said cover member and said base member; and curing said encapsulating material.

10. The method defined in claim 9 wherein said curing of said encapsulating material is accomplished by applying heat to the assembly.

11. The method defined in claim 9 in which the volume of space in said gap is substantially equal to the space in said opening formed through one of said members.

12. The method defined in claim 9 in which the encapsulation material is an epoxy resin and the material is subjected to a curing step under heat.

13. A method of making an encapsulated electrical circuit module comprising the steps of:

providing a nonconductive base member having a flat surface thereon;

forming an electrically conductive circuit pattern on said surface of said base member with termination pads for said circuit adjacent the edges of said base member;

attaching electrical components to said base member in contact with said electrical connectors thereon;

attaching the ends of terminal leads to said termination pads on said base member;

providing a cover member having a flat surface of substantially the same shape as said base member;

forming at least one opening through said cover member;

positioning said cover member with said flat surface thereof facing said flat surface of said base member and forming a gap between said members having a volume substantially equal to the volume of said opening in said cover member; and inserting through said opening in said cover member a liquefied, normally solid encapsulating material; and subjecting the assembly to heat thereby to cause said encapsulating material to flow by capillary action in said gap between said members and to seal around said electrical components and said ends of said terminal leads.

14. The method defined in claim 13 in which the cover member is positioned against the ends of said terminal leads attached to said termination pads thereby forming a gap substantially equal to the thickness of said terminal leads.

* * * * *